United States Patent
Lüchinger et al.

(10) Patent No.: US 6,909,058 B2
(45) Date of Patent: Jun. 21, 2005

(54) BALANCE WITH A WEIGHING COMPARTMENT

(75) Inventors: Paul Lüchinger, Uster (CH); Eduard Fringeli, Bubikon (CH); Beat Meister, Wolfhausen (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/729,665

(22) Filed: Dec. 5, 2003

(65) Prior Publication Data
US 2004/0079558 A1 Apr. 29, 2004

Related U.S. Application Data

(62) Division of application No. 09/957,933, filed on Sep. 21, 2001, now Pat. No. 6,686,545.

(30) Foreign Application Priority Data

Oct. 4, 2000 (CH) ............................................. 1958/00

(51) Int. Cl.[7] ............................................. G01G 21/28
(52) U.S. Cl. ........................................ 177/180; 177/238
(58) Field of Search ................................ 177/180, 181, 177/238–244

(56) References Cited

U.S. PATENT DOCUMENTS

| 4,858,711 A | * | 8/1989 | Kunz .......................... 177/212 |
| 6,515,238 B1 | * | 2/2003 | Martens et al. ............. 177/180 |
| 2004/0118620 A1 | * | 6/2004 | Fringeli et al. |

* cited by examiner

Primary Examiner—Randy W. Gibson
(74) Attorney, Agent, or Firm—Friedrich Kueffner

(57) ABSTRACT

A balance (1) has a weighing compartment (4) that borders on a stationary part (8, 9) of the balance and is otherwise enclosed by at least one side wall panel (5, 6), a front wall panel (7), and a top cover panel (12). At least one of the panels is slidable by means of a guiding device (17, 20) to open and close the weighing compartment (4). The balance (1) further has cutout passages (20) in the side wall panels (5, 6), the front wall panel (7), the top cover panel (12), and/or the rear wall of the weighing compartment, so that cables and/or conduits can be introduced from the outside into the weighing compartment.

14 Claims, 3 Drawing Sheets

BALANCE WITH A WEIGHING COMPARTMENT

CROSS-REFERENCE TO RELATED APPLICATION

This application is a divisional of U.S. patent application Ser. No. 09/957,933, filed Sep. 21, 2001 now U.S. Pat. No. 6,686,545.

BACKGROUND OF THE INVENTION

The present invention relates to a balance with a weighing compartment that borders on a stationary part of the balance and is otherwise enclosed by at least one side wall, a front wall, and a top cover panel, where at least one of the walls and/or the top cover panel is slidable by means of a guiding device to open and close the weighing compartment.

A known balance of this kind, as described for example in the European patent application EP-A-0 234 008, has a weighing pan and a weighing compartment that encloses the weighing pan on all sides, with a stationary front glass wall, rearward-sliding side walls, a rearward-sliding top cover panel, and a connector that joins the side walls with the top cover panel. The connector is configured so that when a side wall and/or the top cover panel is opened or closed, the connector moves together with the side wall and/or the top cover panel, so that the weighing compartment is freely accessible without being obstructed by frame members on the sides. Furthermore, the side walls can be opened and closed individually or together, with or without moving the top cover panel at the same time. The movement can be motorized or manual. With manual operation, the walls that are to be moved are uncoupled from the motorized drive mechanism.

The European patent application EP-A-0 574 668 discloses a balance that has a draft-protection housing with a top cover panel that can be attached or taken off by means of a manually operated locking arrangement. After the top cover panel has been taken off, the front wall as well as the side walls can be completely removed from the housing for cleaning. In this known design of a balance, the top cover panel is part of a frame that holds the draft-protection housing together. To a certain extent, the walls are unobstructed by the frame members so that the operator has a better view of the interior of the housing, but for some applications, this design is still not entirely satisfactory. One drawback is that the upper part of the frame is still a required element, and another concern is that the locking elements, which have to be manufactured with high precision, require a certain amount of manipulation in order to align them with the recesses in which they are received.

In state-of-the-art balances, if conduits, hoses, or other connections have to be introduced into the weighing compartment in a flexible, non-permanent arrangement, a slidable side wall or the top cover panel has to stay at least partially open during the weighing process, because the rigid frames and complicated guiding devices do not allow the walls to be provided with individual, easily accessible conduit passages. However, leaving a wall open can cause errors in the weighing result.

In essence, known balances suffer from the drawback that they do not simultaneously allow free, unrestricted access to the weighing compartment as well as an unobstructed view of the weighing pan. Simultaneous access from the side and from above is not possible, a problem that applies in particular to the accessibility for conduits, hoses or other connections.

OBJECT OF THE INVENTION

It is therefore the object of the present invention, to provide a balance with good accessibility to the weighing compartment so that conduits into the weighing compartment can be installed in a simple manner with a minimum of manipulation.

SUMMARY OF THE INVENTION

The present invention offers a solution to the aforedescribed problem in a balance with a weighing compartment that borders in part on a stationary part of the balance and is otherwise enclosed by at least one side wall panel, a front wall panel, and a top cover panel panel, where at least one of the walls and/or the top cover panel is slidable by means of a guiding device to open and close the weighing compartment. According to the invention, passage openings are provided in the side walls, the front wall, the top cover panel, and/or the rear wall of the weighing compartment for conduits and cables.

This concept has a multitude of possible applications where experiments are conducted inside the weighing compartment and weight changes are observed as part of the experiment, for example when reagents are dispensed into a beaker on the balance pan, or when a chemical reaction is being studied. In a particularly advantageous embodiment, the passage openings can be closed off against air drafts by means of clip-on covers.

The availability of cutout passages offers a simple way of running electrical supply or data cables or conduits for fluids and gases through the cutout passages, to secure the cables and conduits in the cutout openings by means of special clip holders, and to seal the openings against air drafts. Special configurations of the clip-on devices, e.g., as holder elements, expand the range of their possible uses.

A preferred embodiment is configured so that the side walls, the front wall, and the top cover panel can be individually separated by hand from the balance by simply pulling at them lightly to tilt them outwards, e.g., for easy cleaning of the wall plates, which are normally made of glass. When they are in their working position, the walls are positively locked into place in guide elements of the guiding device. The same hand movement is used to unlock each of the walls. Besides making the weighing compartment easy to disassemble for cleaning, the concept of integrating the holder arrangements of the slidable walls in the guiding devices also accomplishes the objective of making the weighing compartment freely accessible and of allowing an unobstructed view of the weighing pan even when the weighing compartment is closed, with no sight-blocking frame members being in the way. In addition, the inventive concept offers the possibility to set the front wall panel as well as the movable wall panels into a stable inclined position through a simple manual procedure.

A special embodiment of the balance according to the invention has an accessory unit arranged, e.g., at the rear of the balance. The accessory unit contains power supplies and/or control units. Cables connected to this accessory unit through openings can be routed to the cutout passages through special guide channels along the balance housing, so that they will not interfere with the movement of the side walls.

BRIEF DESCRIPTION OF THE DRAWINGS

Further details of the invention may be learned from the following description of embodiments that are illustrated in the drawings, wherein.

DETAILED DESCRIPTION OF PREFERRED EMBODIMENTS

Figure 1:
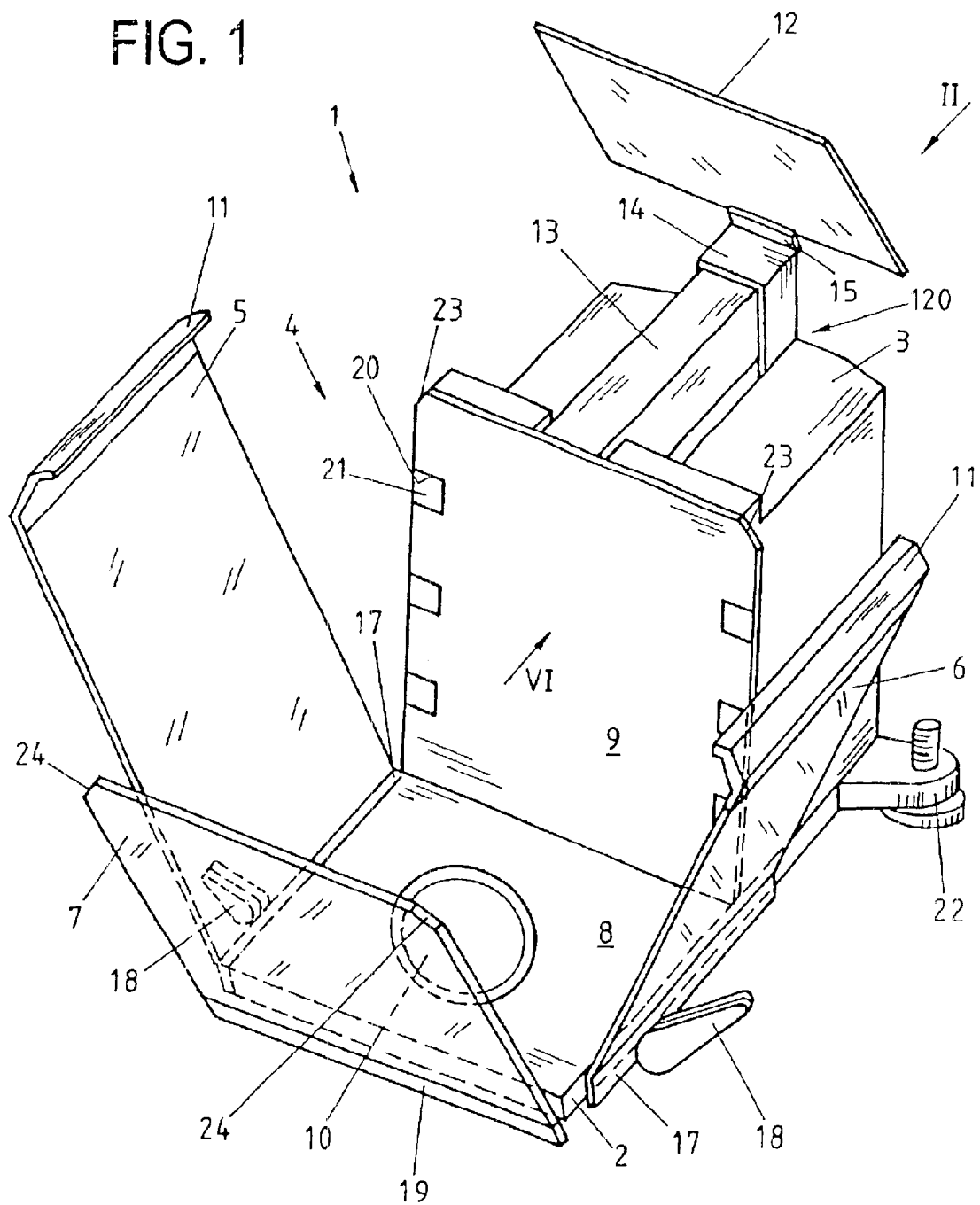
FIG. 1 represents a perspective frontal view of a balance according to the invention.

A balance according to FIG. 1 has a stationary part with a floor compartment 2 that contains a portion of the working system of the balance, a housing 3 that essentially contains the drive mechanism, and a weighing compartment 4. The rear wall 9 and the floor 8 of the weighing compartment 4 are formed by the stationary part. The weighing compartment 4 is further enclosed by the side walls 5, 6, the front wall 7, and the top cover panel 12, which serve as a draft shield. The floor 8 has a pass-through opening for the carrier of the weighing pan 10. However, the weighing pan can also be supported by an L-shaped cantilever arm that is attached to a coupling arrangement that passes through the rear wall of the weighing compartment, as described in EP 1 195 586 A1. The different designs of the weighing pan and/or the features of the weighing compartment described in the reference just mentioned are likewise applicable to the balance described herein.

Preferably, the balance 1 stands on three feet 22.

The side walls 5, 6, the front wall 7, and the top cover panel 12 consist of a transparent material, preferably glass. It is also possible to use tempered glass, especially to make the balance safer for applications in rough environments or to make the walls less delicate to handle, so that they can, e.g., be washed in a machine.

The side walls 5, 6 and the top cover panel 12 are slidable by means of a drive mechanism, e.g., a pull-cord drive, to open and close the weighing compartment. Each of the side walls 5, 6 and the top cover panel 12 are releasably attached to a guiding device 17, 120 by means of holder elements that are integrated in the guiding devices 17, 120. The front wall 7 is likewise releasably attached with a holder element 19.

By pulling them slightly in a tilting movement, the side walls 5, 6, the front wall 7, and the top cover panel 12 can easily be removed from their holder elements for cleaning. The concept further offers the possibility to set the front wall panel 7 as well as the movable wall panels 5, 6, 12 into a stable inclined position by a simple manual operation.

In their opened position, the side walls 5, 6 as well as the top cover panel surround the housing 3. This is possible, because the housing 3 is dimensioned smaller in width and height than the weighing compartment 4.

The guiding devices 17, 120 of the side walls 5, 6 as well as of the top cover panel 12 have coupling elements (not shown in FIG. 1) by which the side walls 5, 6 and the top cover panel 12 are connected to the pull cords of a drive mechanism. Each of the side walls 5, 6 has a separate actuator handle 18 for the coupling element, as does the top cover panel 12 (not shown in FIG. 1). This makes it possible to open and close the side walls 5, 6 and the top cover panel 12 either individually or in any combination of two, or all at the same time.

The balance 1 is equipped with a carrying handle 13 at the top of the housing 3. In addition to its carrying function, the handle 13 also serves as a guide track for opening and closing the top cover panel 12. A guide element 14 of the guiding device 120 runs along the guide track. The top cover panel 12 is attached to the guide element 14 through the holder element 15. As described above, the holder element 15 of the top cover panel 12 is configured in such a way that the top cover panel 12 can be taken off, e.g. for cleaning, by a simple tilting movement.

The top edges of the side walls 5, 6 are framed by inward-slanted border pieces 11 that hold the top edges in place through snap-closure elements (not shown in FIG. 1) and rest against the slanted corner sections 23, 24 of the rear wall 9 and the front wall 7, respectively. The angled portions of the border pieces can overlap differently shaped top edges of the side walls 5, 6 and also of the top cover panel 12 in such a manner that they form a kind of baffle seal against the outside air, so as to block air drafts even more effectively from entering the weighing compartment 4 than do common types of draft shields. As a further advantageous feature, the border pieces 11 can be made of a transparent material.

No special actuating device for tightening or releasing a clamp hold is necessary to hold the front wall panel 7 (and likewise the other panels 5, 6 and 12 of the weighing compartment 4) in place. Thus, in the sense of the foregoing discussion, the illustrated holder element 19 as well as the holder elements of the other walls provide a firm attachment in the operating position without requiring actuation of a fastener.

As mentioned above, the rear wall 9 of the weighing compartment is wider as well as taller than the housing 3. This makes it possible to provide cutout passages 20 in the rear wall 9 that can be arranged on the sides as well as on top. The cutout passages 20 can be closed by means of interchangeable clip-on covers 21. For example, the clip-on covers could be removed from one or more of the cutout passages 20 in order to provide passages for supply lines such as electrical cables and/or hoses for liquids that are to be weighed. In this way, experiments can be performed inside the weighing compartment while simultaneously observing weight changes without having to open the weighing compartment and thereby running the risk of causing weighing errors. Of course, cutout passages 20 could conceivably be provided also in the side walls 5 or 6 and/or in the top cover panel 12.

Figure 2:
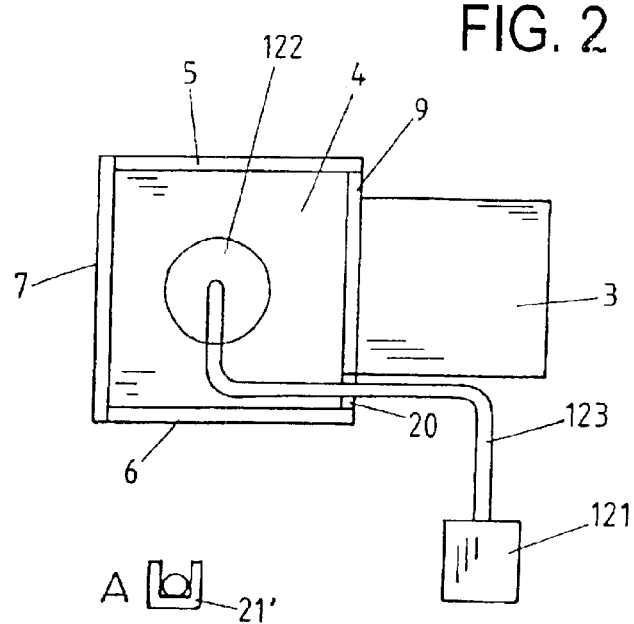
FIG. 2 shows a possible use for the cutout openings in the rear wall as seen from above.

FIG. 2 illustrates a possible use for the cutout passages 20 in the rear wall 9 as seen from the top. While the cutout openings are usually closed off by clip-on covers to keep out air drafts, the clip-on covers can be removed so that the openings can be used as passages for conduits, hoses, etc. FIG. 2 shows an example where a liquid is dispensed from the container 121 through the conduit 123 by way of the cutout opening 20 to the container 122 for weighing. Instead of leaving the cutout 20 entirely open, it is advantageous to use a special U-shaped clip-on device 21' (see detail A) to better hold the conduit in place and to seal out air drafts.

Figure 3:
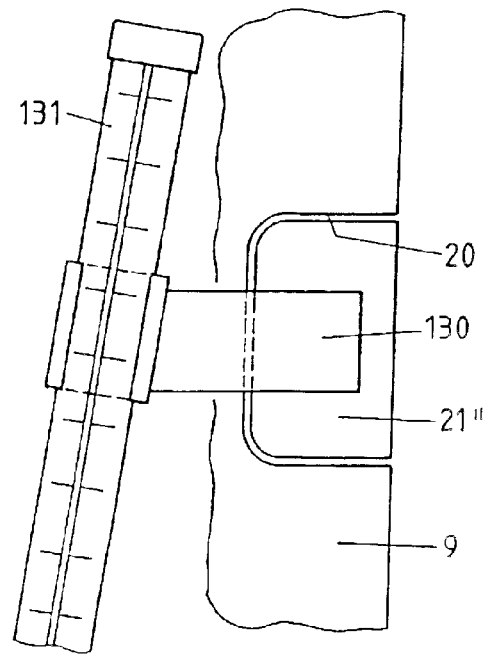
FIG. 3 shows a possible use for the clip-on devices, as seen from the front.

As a further use for clip-on devices inserted into the cutout passages 20, FIG. 3 shows an example of a clip-on device 21" with an equipment holder 130 that extends into the interior of the weighing compartment 4. Equipment holders 130 that are installed in this manner can be used for the flexible and removable arrangement of conduits, hoses, a thermometer 131 and/or all kinds of tools that are needed for experimenting inside the weighing compartment 4.

Figure 4:
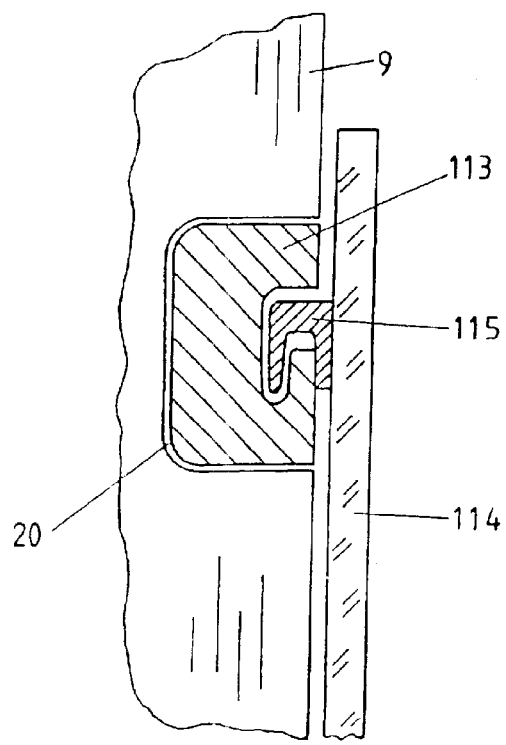
FIG. 4 shows a possible use of the clip-on devices for an embodiment of the balance with wall panels of reduced height, in a sectional view.

A further application for the cutout openings is shown in FIG. 4. It is conceivable to use versions or configurations of the balance where the side walls 114 are of a different height. In order to move the different side wall panels 114 with the drive mechanism according to the invention, a guide needs to be provided in the upper portion of the wall panel 114. This can be accomplished by using suitable clip-on devices 113 that are inserted into the cutout passages 20. Connected to the wall panels 114 are holder rails 115 that are slidably guided by the clip-on devices 113. Of course, removing the panels 114 from the balance is an equally simple procedure as described above for the wall panels 5, 6.

Figure 5:
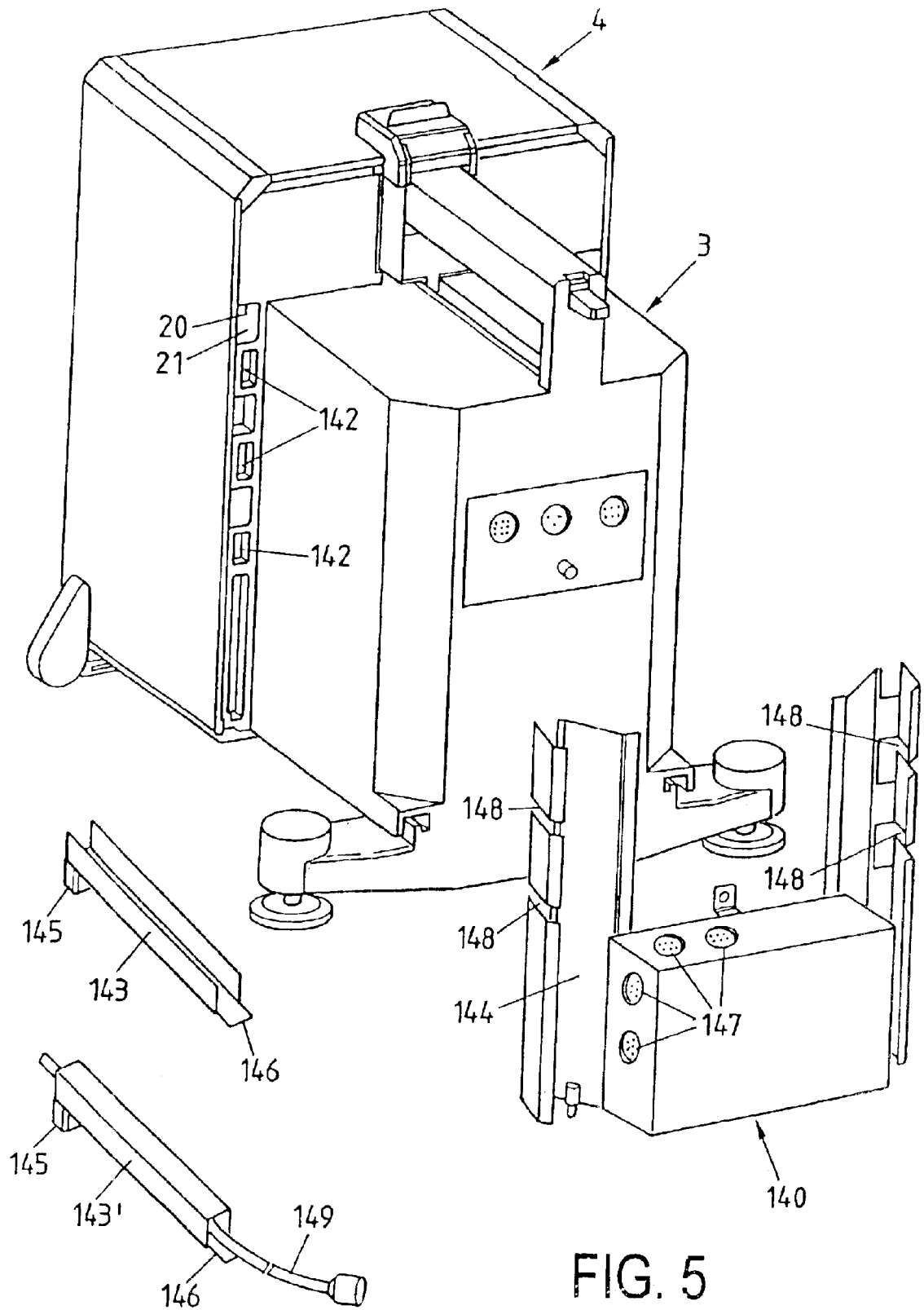
FIG. 5 shows a balance seen at an oblique angle from the rear with accessory unit, holder device and guide channels, in a three-dimensional representation.

As shown in FIG. 5, an accessory unit 140 can be releasably attached to the rear of the balance with a simple fastener, e.g., a screw with a knurled head. The accessory unit 140 can contain power-supply units such as a battery, or an electronic control module. The accessory unit 140 has openings 147 for different kinds of connectors. This allows experimental setups, e.g., dispensing devices, in the weighing compartment 4 to be electrically connected to the accessory unit 140. The cables and conduits enter the weighing compartment 4 through the cutout passages 20, which are equipped with special clip-on holders comparable to the clip-on device 21'. To prevent the electrical cables and/or conduits, such as the conduit 123 in FIG. 2, from interfering with the movement of the side walls 5, 6 as the latter slide back along the housing 3, the rear wall 9 has recesses 142 for the attachment of guide channels 143 on both sides of the housing 3. The guide channels are further held in place by slots 148 of a holder device 144 of the accessory unit 140. The guide channels 143 can for example be made of metal or of a polymer material. As illustrated in FIG. 5, the guide channels can be designed in different ways; for example, the guide channel 143' is covered on top, so that it has the shape of a tube. It is also conceivable to design the guide channels as side-mounted modules attached to the housing 3 and extending over one or more of the cutout passages 20. A further possibility is to arrange a simple electronic module or part of a module in the guide channels, particularly in an embodiment without the accessory unit 140.

The width of the guide channels 143, 143' is limited, given that twice the channel width added to the width of the housing 3 has to be less than the width of the rear wall 9 in order to avoid interference with the free movement of the side wall panels 5, 6. The ends of the guide channels 143 are configured as connectors 145, 146 to attach the guide channels to the rear wall and to the holder device 144, respectively. The advantage of this concept is that the weighing compartment 4 can be kept closed to the outside, while experimental setups inside the weighing compartment 4 of the kind that are described in detail, e.g., in EP 1 195 584 A1 can still be supplied and operated.

Of course, the housing 3, which is in essence occupied by the drive mechanism, and the accessory unit 140 could be combined in a common housing. The guide channels 143 for conduits and cables could be integrated in the side walls of the common housing and they could also be closed to the outside with special covers.

What is claimed is:

1. A balance (1) comprising a weighing compartment (4) that borders on a stationary part (8, 9) of the balance and is otherwise enclosed by at least one side wall panel (5, 6), a front wall panel (7), and a top cover panel (12); wherein at least one of said panels is slidable by means of a guiding device (17, 20) to open and close the weighing compartment (4); wherein at least one of the at least one side wall panel (5, 6), the front wall panel (7), the top cover panel (12), and the stationary part (8, 9) has cutout passages (20) for cables and conduits (123), wherein the cutout passages (20) are configured to receive clip-on devices (21, 21',21", 113).

2. The balance (1) of claim 1, wherein the cutout passages (20) are configured to receive clip-on cable-holder devices (21') for holding said cables and conduits (123) in place.

3. The balance (1) of claim 2, wherein said clip-on cable holder devices (21') are U-shaped.

4. The balance (1) of claim 1, wherein the cutout passages (20) are configured to receive clip-on tool holder devices (21") equipped with tool holders (130).

5. The balance (1) of claim 1, further comprising slidable side wall panels (114), wherein the cutout passages (20) are configured to receive clip-on devices (113) that cooperate with holder rails (115) as part of the guiding device for the slidable side wall panels (114).

6. The balance (1) of claim 1, wherein the front wall panel (7) is non-slidable, the at least one side-wall panel (5, 6) and the top-cover panel (12) are slidable, and wherein each of the panels (5, 6, 7, 12) is attached to the stationary part (8, 9) by means of a holder element which allows each of said panels (5, 6, 7, 12) to be individually locked in place and released by a simple application of manual force.

7. The balance (1) of claim 1, wherein the at least one of the panels (5, 6, 12) that is slidable is individually separable from the balance (1) by manually pulling said panel (5, 6, 12) outwards in a tilting movement.

8. The balance (1) of claim 1, wherein each of the panels (5, 6, 7, 12) can be set to a stable inclined position by a simple application of manual force.

9. The balance (1) of claim 1, wherein the panels (5, 6, 7, 12) are free of sight-blocking frame members, thereby allowing an unobstructed view into the weighing compartment (4).

10. The balance (1) of claim 1, comprising an accessory unit (140) containing modules from the group of electric power supplies and control electronics.

11. The balance (1) of claim 10, wherein the stationary part of the balances comprises a housing (3) and the accessory unit (140) is integrated in the housing (3).

12. The balance (1) of claim 10, wherein the accessory unit (140) comprises passages (147) for the cables and conduits (123).

13. The balance (1) of claim 12, wherein the accessory unit (140) is connected to the rear wall (9) through guide channels (143, 143') for the cables and conduits (123).

14. The balance (1) of claim 13, wherein the guide channels (143, 143') are integrated in the housing (3) and can be closed to the outside by means of covers.

* * * * *